United States Patent
Huang

(10) Patent No.: US 8,676,439 B2
(45) Date of Patent: Mar. 18, 2014

(54) INFORMATION PROCESSING ADAPTER FOR ON-BOARD DIAGNOSTICS

(75) Inventor: Wen-Huo Huang, Hsinchu County (TW)

(73) Assignee: Sung Jung Minute Industry Co., Ltd., Hsinchu County (TW)

( * ) Notice: Subject to any disclaimer, the term of this patent is extended or adjusted under 35 U.S.C. 154(b) by 140 days.

(21) Appl. No.: 13/080,298

(22) Filed: Apr. 5, 2011

(65) Prior Publication Data
US 2012/0258627 A1    Oct. 11, 2012

(51) Int. Cl.
*G01M 17/00*     (2006.01)
*G06F 7/00*      (2006.01)
*G06F 19/00*     (2011.01)

(52) U.S. Cl.
USPC ....................................... 701/33.2

(58) Field of Classification Search
USPC ....................... 439/620.1; 701/33.2
See application file for complete search history.

(56) References Cited

U.S. PATENT DOCUMENTS

| | | | |
|---|---|---|---|
| 2003/0167345 A1* | 9/2003 | Knight et al. | 709/249 |
| 2004/0111188 A1* | 6/2004 | McClure et al. | 701/1 |
| 2009/0289756 A1* | 11/2009 | Raichle et al. | 340/2.1 |
| 2010/0134964 A1* | 6/2010 | Smith et al. | 361/679.2 |
| 2010/0204878 A1* | 8/2010 | Drew et al. | 701/33 |

FOREIGN PATENT DOCUMENTS

TW    M338779    8/2008

* cited by examiner

*Primary Examiner* — Khoi Tran
*Assistant Examiner* — Harry Oh
(74) *Attorney, Agent, or Firm* — Muncy, Geissler, Olds & Lowe, P.C.

(57) ABSTRACT

An information processing adapter for an on-board diagnostic (OBD) includes an input connector inserted into a socket of the OBD, a circuit board connected to the input connector and a first output connector connected to the circuit board. The circuit board has a controller area network (CAN) transceiver and a microcontroller. The adapter gets vehicle driving information through the input connector and transmits to the microcontroller through the CAN transceiver to perform interpretation and format conversion, then sends the converted vehicle driving information to an external electronic device through the first output connector. With the format of vehicle driving information converted by the adapter, the information can be directly displayed or stored in various electronic devices without specific specification.

11 Claims, 5 Drawing Sheets

INFORMATION PROCESSING ADAPTER FOR ON-BOARD DIAGNOSTICS

FIELD OF THE INVENTION

The present invention relates to an information processing adapter for an on-board diagnostic and particularly to an adapter adopted on the on-board diagnostic to interpret vehicle driving information.

BACKGROUND OF THE INVENTION

An on-board diagnostic (OBD in short hereinafter) device is installed on a vehicle and connected to a computer of the vehicle to get executing conditions and set data of the vehicle computer to determine whether the vehicle has malfunction.

In general, a driver usually installs a display, such as a head up display (HUD in short hereinafter), through an adapter inserted into a socket of the OBD to capture and display vehicle driving information. For instance, R.O.C. patent No. M338779 discloses an HUD device connected to a socket of an OBD-II to get information and supply power, and also perform decoding and conversion. The HUD device includes a 16 pin to 4 pin adapter inserted into an OBD-II socket, a metal conductive wire set connected to the adapter, an electronic integrated host having a communication conversion unit processor and a control circuit board with HUD function. When a vehicle is started to form electrical connection, power supply is provided and signal is captured. When in use, the communication conversion unit processor accesses related signals and decodes various communication protocol signals to become input signals required for the display for displaying.

While the aforesaid conventional technique can transmit vehicle driving information through the adapter to the HUD device for displaying, the format of the vehicle driving information transmitted through the adapter cannot be recognized by the display. Hence the vehicle driving information must be accessed by a communication conversion unit processor (namely a controller area network transceiver) in the HUD device and converted into a format which can be recognized by the display for displaying.

Thus the adapter can only be inserted into a specific electronic device, namely the one equipped with the aforesaid communication conversion unit processor such as the HUD device. As a result, the specification of external devices connected to the adapter is limited so that the adapter cannot be widely adapted to other external devices such as mobile phones, computers, PDAs or the like.

SUMMARY OF THE INVENTION

The primary object of the present invention is to overcome the limited usability problem in the conventional adapter used on the socket of the OBD by providing an adapter adaptable to various external electronic devices.

To achieve the foregoing object, the present invention provides an information processing adapter for the OBD. The information processing adapter of the invention includes an input connector inserted into a socket of the OBD, a circuit board connected to the input connector and a first output connector connected to the circuit board. The circuit board has a CAN transceiver and a microcontroller. The adapter gets vehicle driving information through the input connector and transmits it to the microcontroller through the CAN transceiver for interpretation and format conversion, then the converted vehicle driving information is transmitted through the first output connector to an external electronic device. Thus forms the main structure of the invention.

In embodiments of the invention, the socket and input connector respectively conform to J1962 DLC specification, and the first output connector has an interface of USB, Mini USB or Micro USB. The first output connector can be connected to a transmission cable to transmit the vehicle driving information or connected to a wireless transmission device to perform wireless transmission. The adapter further includes a housing to hold the circuit board. The housing has a first opening to couple with the input connector, a second opening to couple with the first output connector and a third opening to couple with a second output connector. The second output connector also conforms to J1962 DLC specification.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENTS

Figure 1:
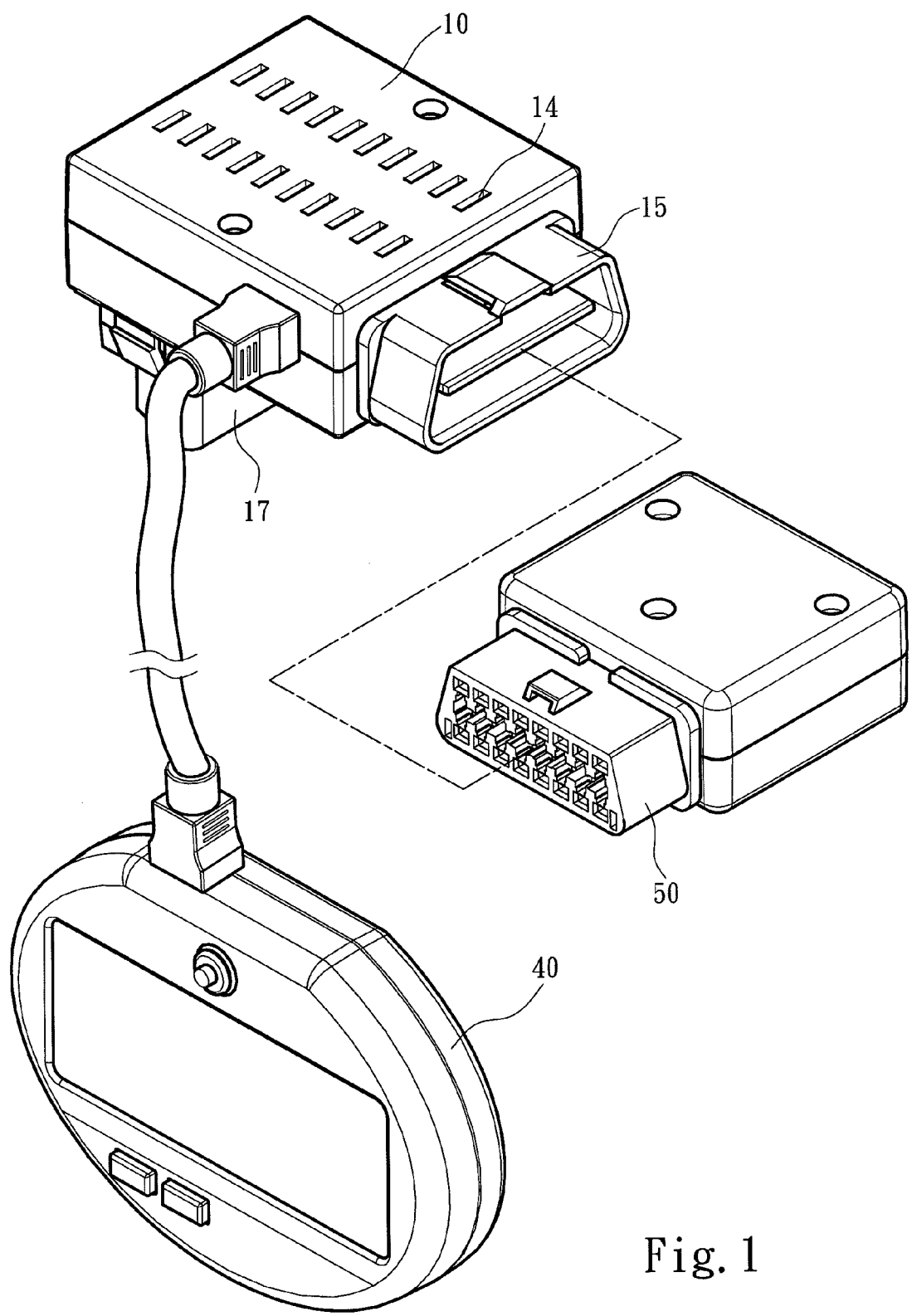
FIG. 1 is a perspective view of the invention.
Figure 2:
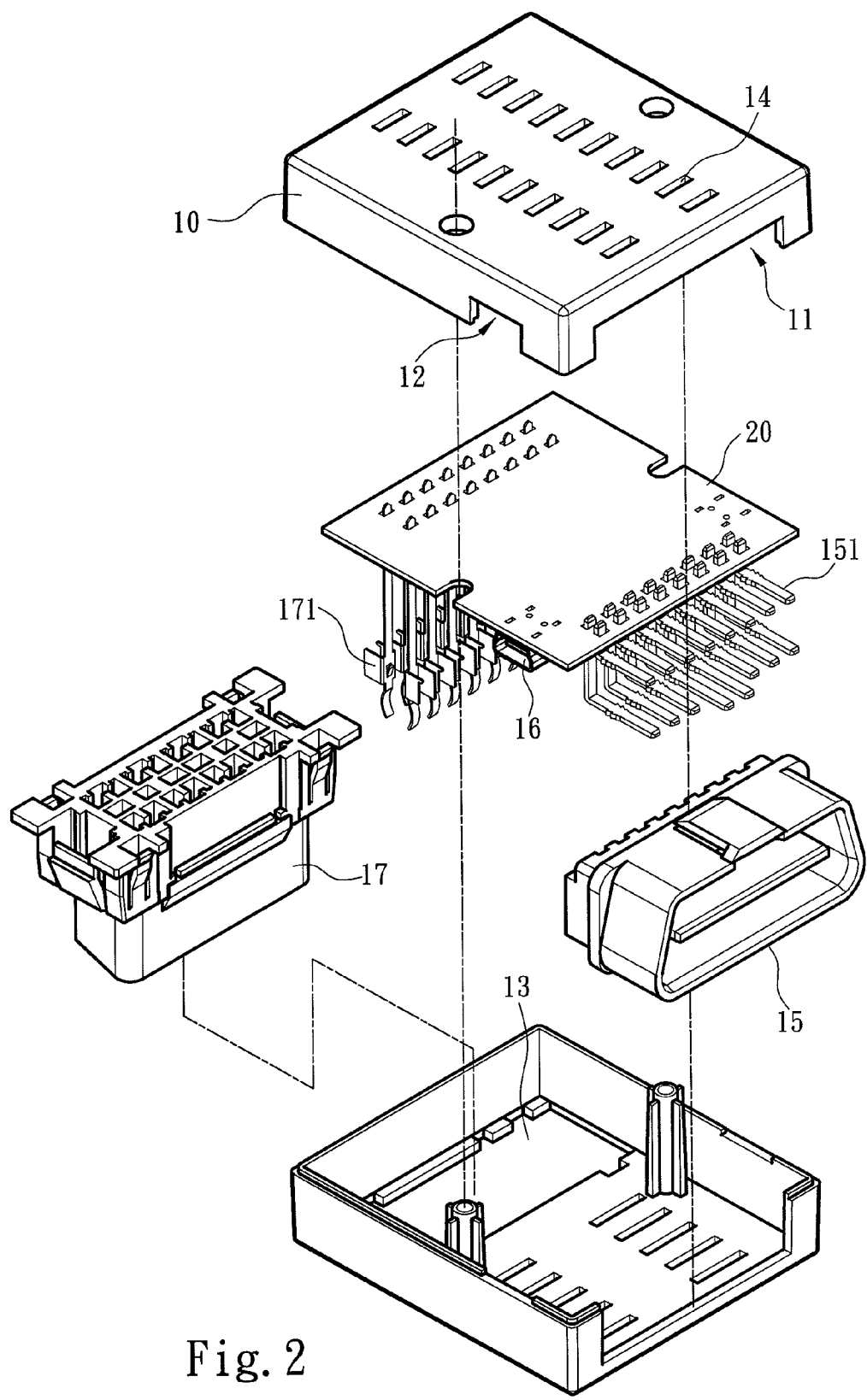
FIG. 2 is an exploded view of the invention.

Please refer to FIGS. 1 and 2, the present invention aims to provide an information processing adapter for an on-board diagnostic (OBD in short hereinafter). The information processing adapter is connected to the OBD to capture vehicle driving information and transmit the vehicle driving information after interpretation to an external electronic device. The external electronic device can be a head up display (HUD in short hereinafter) 40 as shown in the drawings. The adapter of the invention includes a housing 10 to hold a circuit board 20 inside. The circuit board 20 is electrically connected to an input connector 15, a first output connector 16 and a second output connector 17. The input connector 15 is inserted into a socket 50 of the OBD to capture the vehicle driving information. The input connector 15 and socket 50 respectively conform to J1962 DLC specification. The input connector 15 has sixteen input pins 151 connected to the circuit board 20. The first output connector 16 can be formed in a USB, Mini USB or Micro USB specification, and is fastened to the circuit board 20. The second output connector 17 also conforms to J1962 DLC specification and has sixteen output pins 171 connected to the circuit board 20. The second output connector 17 can be an extension of the socket 50 of the OBD. When connecting to an external electronic device with the OBD specification is desired, such as a garage computer, there is no need to remove the adapter but can directly connect to the second output connector 17 to meet requirements. Thus through the first and second output connectors 16 and 17, the vehicle driving information can be transmitted to a device with specification the same as or different from the OBD.

The housing 10 has a first opening 11, a second opening 12 and a third opening 13 to couple respectively with the input connector 15, the first output connector 16 and the second output connector 17. The input connector 15 is held in the first opening 11. The first output connector 16 is extended from the interior of the housing 10 to the second opening 12 and exposed on the second opening 12. The second output connector 17 is held in the third opening 13. The second output connector 17 is not limited to be perpendicular to the input connector 15 in the embodiment shown in the drawings, it also can be parallel therewith. The housing 10 has a plurality of heat dissipation vents 14 to disperse the heat generated by the circuit board 20 inside the adapter when in use.

Figure 3:
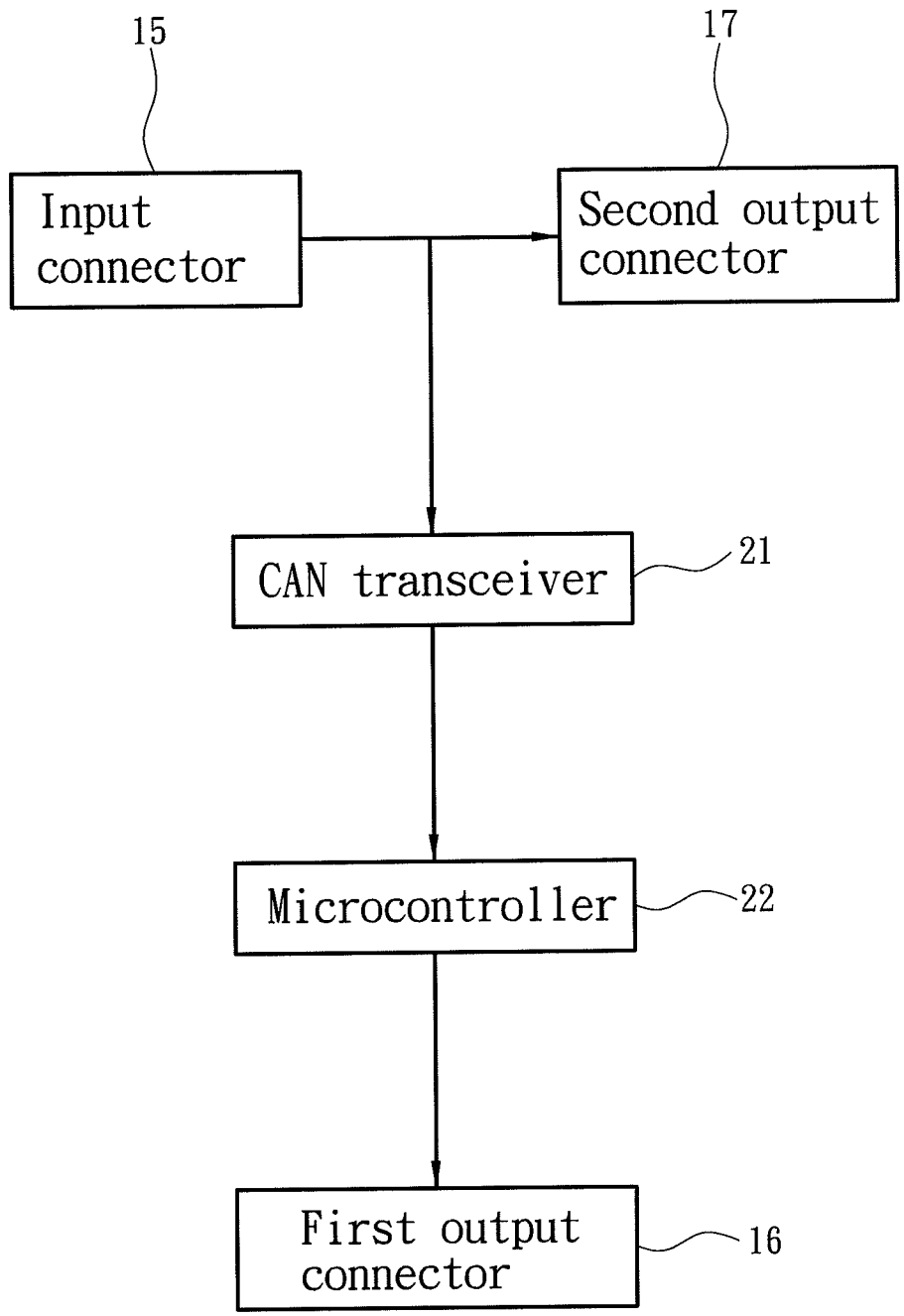
FIG. 3 is a circuit block diagram of the invention.
Figure 4:
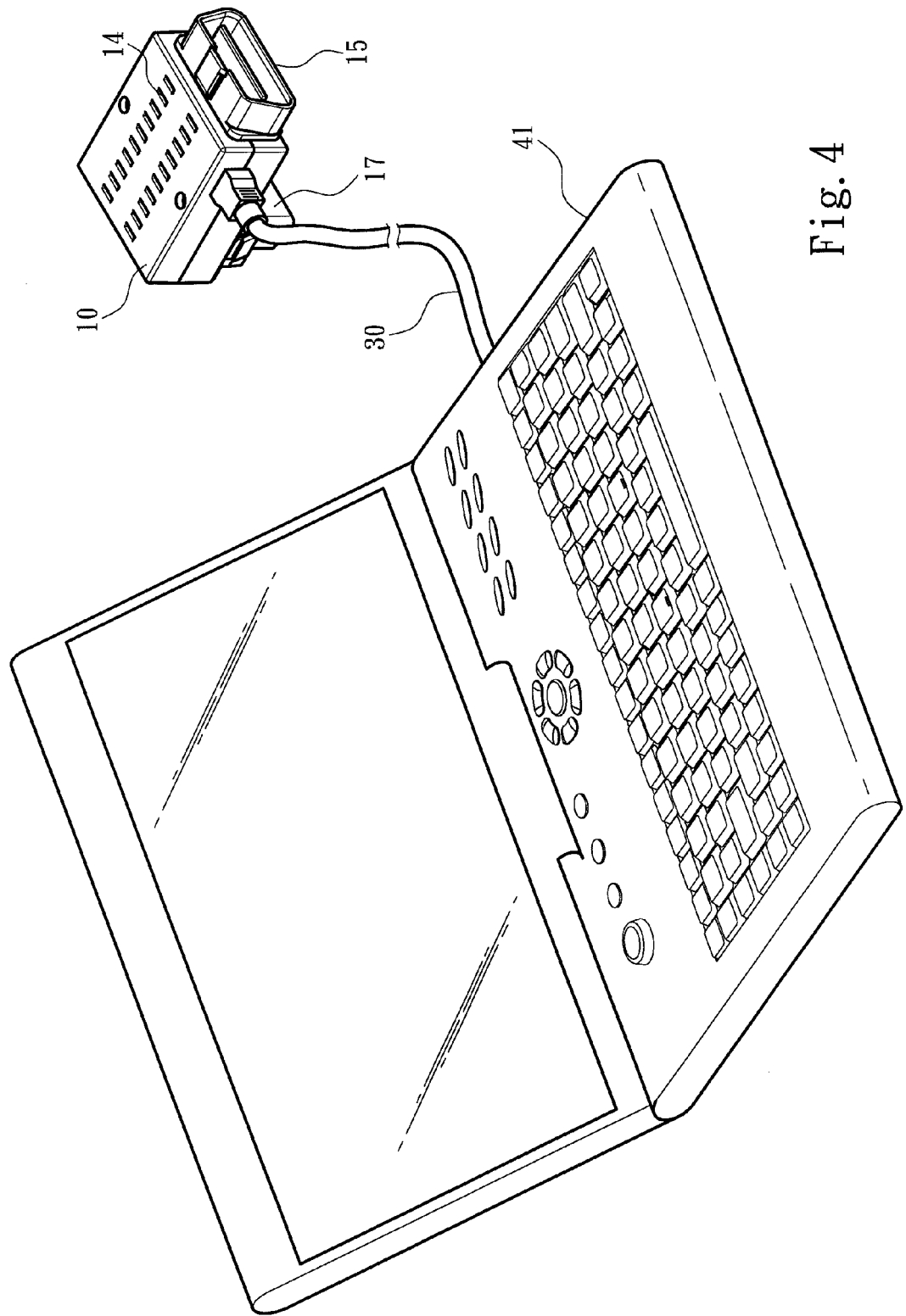
FIG. 4 is a schematic view of another embodiment of the invention.

Please refer to FIG. 3, the circuit board 20 has a transmission circuit bridging the input connector 15 and the second output connector 17 so that the vehicle driving information captured by the input connector 15 can be transmitted to the second output connector 17 through the transmission circuit. Moreover, the circuit board 20 further has a CAN (Controller Area Network) transceiver 21 electrically connected to the input connector 15 and a microcontroller 22 electrically connected to the CAN transceiver 21. The CAN transceiver 21 gets the vehicle driving information from the input connector 15 and recognizes its format, then transmits to the microcontroller 22 for interpretation and format conversion. The converted vehicle driving information is sent to the first output connector 16 and transmitted to an external electronic device through the first output connector 16. The external electronic device can be the HUD 40 shown in FIG. 1 to display the vehicle driving information, such as vehicle speed, rotation speed, water temperature, oil temperature, battery voltage, throttle opening, fuel consumption and the like. Aside from connecting to the HUD 40, the adapter of the invention can also be linked to a computer 41 through a transmission cable 30 as shown in FIG. 4, such as a notebook computer. The transmission cable 30 has one end connected to the first output connector 16 with Mini USB interface and the other end connected to the computer 41 with RS232 interface, thereby the converted vehicle driving information can be sent to the computer 41.

Figure 5:
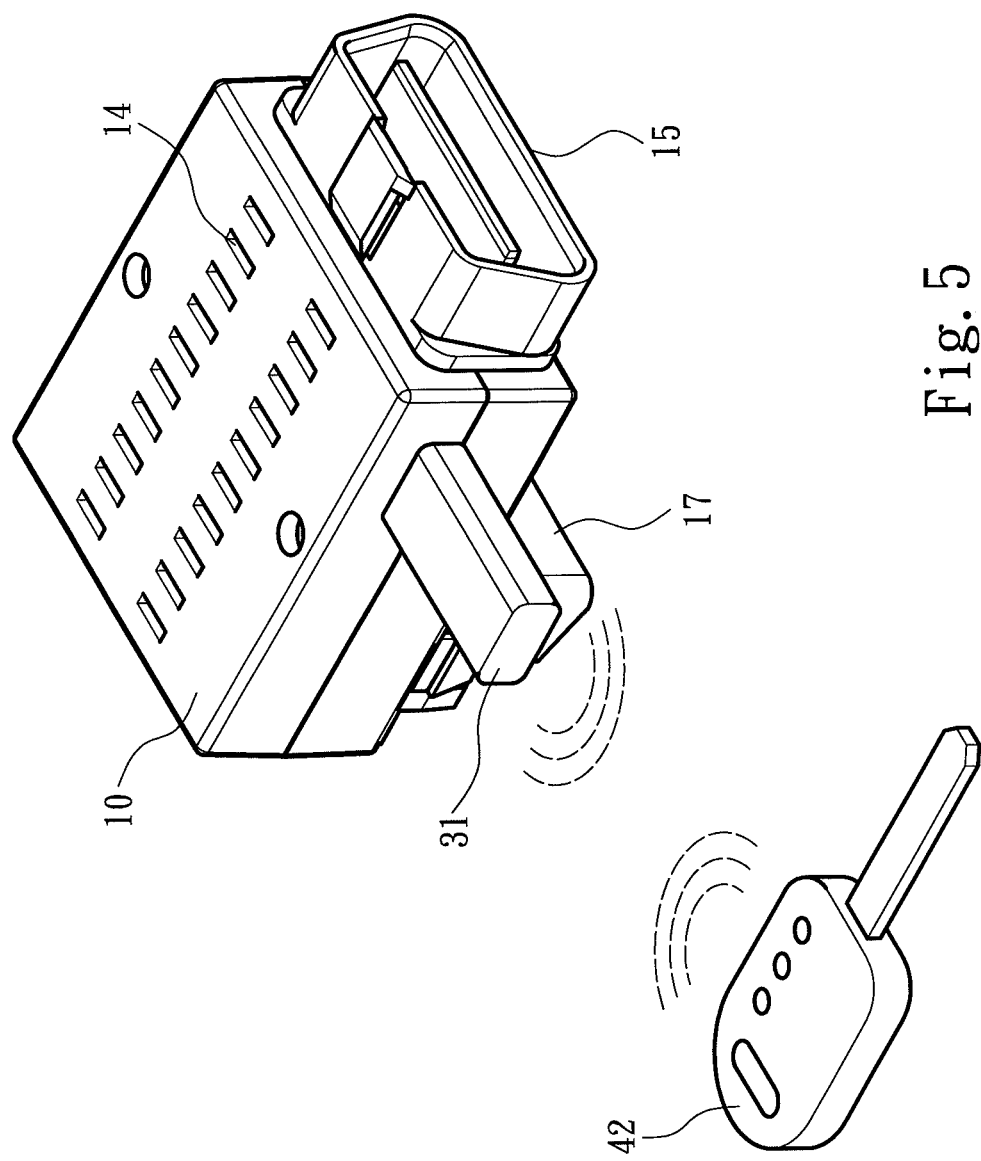
FIG. 5 is a schematic view of yet another embodiment of the invention.

The adapter can also send the vehicle driving information via wireless transmission FIG. 5 illustrates such an embodiment as an example. The first output connector 16 is connected to a wireless transmission device 31, such as a Bluetooth transceiver, infrared transceiver or the like. The converted vehicle driving information is transmitted wirelessly to a vehicle key 42. For instance, when the vehicle engine is flamed out, the vehicle driving information can be sent wirelessly to the vehicle key 42 equipped with wireless transceiving function to serve as a burglarproof password. When the driver wants to open the car door or start the vehicle, the vehicle computer detects whether the password of the vehicle key 42 matches the vehicle driving information recorded previously when the vehicle engine was flamed out, then determines whether to unlock the car door or start the vehicle engine to achieve burglarproof effect.

In addition, the wireless transmission device 31 can also be a USB data card to transmit the vehicle driving information to the Internet. Such an approach can be used on motorcade management, and the control center of the motorcade can get information of each vehicle through the Internet. For example, vehicle location and driving route can be known from the signal issuing site of the vehicle to overcome the problem that satellite signals of GPS are easily blocked by buildings. Moreover, vehicle conditions can be obtained and controlled instantly and thoroughly, such as vehicle speed, tire pressure, fuel capacity and the like. In the event that an abnormal condition occurs on a vehicle, the control center of the motorcade can instantly alert the driver to ensure driving safety.

As a conclusion, the invention mainly provides a CAN transceiver 21 in the information processing adapter of the OBD to get the vehicle driving information first, and then interpret and convert the format of the vehicle driving information to transmit to various external electronic devices, such as a HUD 40, computer, mobile phone or the like. Thereby the adapter does not need to incorporate with a specific display. The external electronic devices also do not need to install specific information processing chips to access, store or display the vehicle driving information transmitted by the adapter.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. An information processing adapter for an on-board diagnostic inserted into a socket of the on-board diagnostic to capture vehicle driving information of the on-board diagnostic, comprising:
   a housing;
   an input connector located on the housing and inserted into the socket to connect to the on-board diagnostic to get the vehicle driving information;
   a circuit board which is located in the housing and connected to the input connector, and includes a controller area network transceiver electrically connected to the input connector and a microcontroller electrically connected to the controller area network transceiver, the controller area network transceiver receiving the vehicle driving information through the input connector and transmitting to the microcontroller for interpretation and format conversion; and
   a first output connector which has a different specification from the input connector and is located on the housing and connected to the circuit board to electrically connect to the microcontroller to receive the vehicle driving information converted and output by the microcontroller;
   a second output connector which has the same specification with the input connector and is located on the housing and connected to the circuit board to electrically connect to the microcontroller to receive the vehicle driving information converted and output by the microcontroller, wherein the input connector, the first output connector and the second output connector are located on three different sides of the housing respectively.

2. The information processing adapter of claim 1, wherein the socket and the input connector respectively conform to JI 962 DLC specification.

3. The information processing adapter of claim 1, wherein the first output connector is selectively a USB, a Mini USB or a Micro USB interface.

4. The information processing adapter of claim 1, wherein the first output connector is connected to a computer through a transmission cable.

5. The information processing adapter of claim 1, wherein the first output connector is connected to a wireless transmission device to transmit wirelessly the converted vehicle driving information.

6. The information processing adapter of claim 5, wherein the wireless transmission device is selectively a Bluetooth IO transceiver, an infrared transceiver or a USB data card.

7. The information processing adapter of claim 1, wherein the housing includes a first opening to couple with the input connector and a second opening to couple with the first output connector.

8. The information processing adapter of claim 7 further including a third opening to couple with the second output connector.

9. The information processing adapter of claim 8, wherein the second output connector conforms to J1962 DLC specification.

10. The information processing adapter of claim 7, wherein the housing includes a plurality of heat dissipation vents.

11. The information processing adapter of claim 1, wherein the first output connector is perpendicular to the input connector.

* * * * *